Aug. 9, 1955 A. F. REESE 2,714,898
PRESSURING DEVICE
Filed April 10, 1950
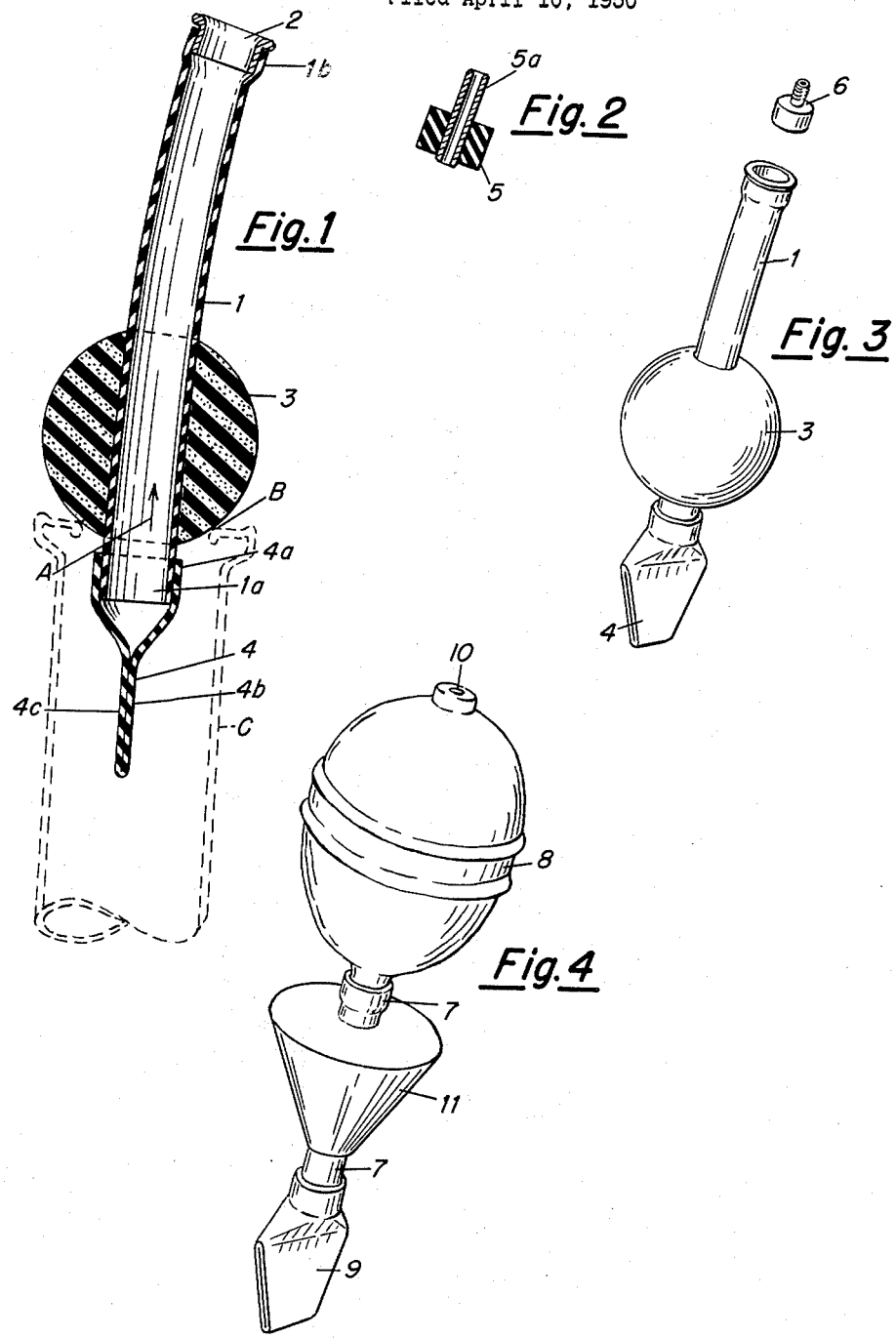
INVENTOR.
ARTHUR F. REESE
BY
Wm. H. Dean
AGENT.

United States Patent Office 2,714,898
Patented Aug. 9, 1955

2,714,898

PRESSURING DEVICE

Arthur F. Reese, San Diego, Calif.

Application April 10, 1950, Serial No. 154,998

1 Claim. (Cl. 137—799)

My invention relates to a pressuring device, more particularly for use in pressuring the interior of automobile fuel tanks, and the objects of my invention are:

First, to provide a very simple device of this class which may be manually operated in order to pressurize the interior of an automobile fuel tank for the purpose of relieving what is commonly known as "vapor lock" in the fuel lines of an automobile leading from the fuel tank to the carburetor of the internal combustion engine thereof;

Second, to provide a device of this class which is provided with means for readily and easily sealing the end of the conventional fuel tank neck during the pressuring thereof by the device;

Third, to provide a device of this class having a novel combination of means for sealing and enclosing the end of the fuel tank neck with a check valve which permits air to flow into the tank through the device, and prevents air from escaping from the tank outwardly;

Fourth, to provide a device of this class which may be solely operated by air, which may be expelled from the lungs of the operator through the device and into the tank;

Fifth, to provide a device of this class which is safe for a person to use manually in expelling the air from his lungs into a gasoline or other fuel tank, due to the particular check valve structure, which prevents gas fumes from passing backwardly from the tank into the operator's lungs;

Sixth, to provide a device of this class which is very easily and quickly operated, and which provides a certain safety factor for the motorist traveling in hot weather, due to the fact that he may pressurize fuel in the fuel tank of his motor vehicle and force expanding vapors through the fuel lines to the carburetor of the vehicle engine, rendering it operative after heat has caused vapor expansion in the lines and stopped operation of the vehicle;

Seventh, to provide a device of this class which is very neat and compact in proportion of its utility; and Eighth, to provide a device of this class which is very simple and economical of construction, efficient in operation, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claim, reference being had to the accompanying drawings and to the characters of reference thereon, forming a part of this application, in which:

Fig. 1 is a longitudinal sectional view of my pressuring device; Fig. 2 is a longitudinal sectional view of a mouthpiece adapter for the air conducting tube of said pressuring device; Fig. 3 is a perspective view of my pressuring device, showing an exploded relationship of the parts, including a pump adapter fitting for use in connection with the air conducting tube of the pressuring device; and Fig. 4 is a perspective view of a modification of my pressuring device, showing a compression bulb which may be compressively manually operated for forcing air through the inlet tube and into a fuel tank of an automobile.

Similar characters of reference refer to similar parts and portions throughout the several views of the drawings.

The air conducting tube 1, rigid tube fitting 2, tank neck sealing member 3, valve 4, mouthpiece adapter 5, and the pump adapter 6, constitute the principal parts and portions of my pressuring device.

As shown in Fig. 1 of the drawings, the air conductor tube 1 may be made of flexible or resilient material, as desired, and it is provided with a compressible neck sealing member 3 surrounding the same and extending diametrically a considerable distance therearound. The valve 4 is secured to the normally lower end 1a of the air conducting tube 1, and is a resilient compression valve of conventional form. This valve 4 is provided with a sleeve portion 4a surrounding the end 1a of the air conducting tube 1, and provided with integral flapper side walls 4b and 4c, which serve as compression checks to prevent air from entering the air conducting tube 1 and passing from the end 1a as indicated by the arrows A in Fig. 1 of the drawings.

The rigid tube fitting 2 is a cylindrical fitting around which the end 1b of the air conducting tube 1 is secured, and this fitting 2 may be used as a mouthpiece, if desired, for blowing air from the operator's lungs manually through the tube 1 and valve 4 into the conventional fuel tank. The tank neck sealing member is preferably made of resilient compressible material, such as sponge rubber or the like, and is adapted to bear in sealing relationship with the edge B of the opening in the upper end of a fuel tank neck, as illustrated by dash lines C in Fig. 1 of the drawings.

The operation of my pressuring device is substantially as follows:

When it is desired to exert pneumatic pressure in a fuel tank to which the neck C, as shown in Fig. 1 of the drawings, is connected, the neck sealing member 3 is placed in enclosing relationship with the opening B in the end of the neck C, and pneumatic pressure is applied internally of the tube 1, which causes the valve flappers 4b and 4c to separate, permitting the air to pass into the fuel tank through the neck C. When the pneumatic pressure is supplied manually by means of a person's lungs, the intermittent pneumatic pressuring operations are accommodated by the valve 4, which shuts off air from returning through the tube 1 in the direction as indicated by the arrow A. In this manner, the operator may take a deep breath and blow air into the fuel tank through the valve 4, and then may take another breath, during which time the valve 4 prevents escape of air from the tank. It is to be noted that, if desired, the mouthpiece adapter 5 may be placed in the fitting 2 and the central tube 5a may be used as a tube fitting or may be used as a mouthpiece, as desired.

In the operation of the arrangement of my pressuring device as shown in Fig. 3 of the drawings, the pump adapter 6 may be placed in the fitting 2, so that a conventional tire pump may be used to force air through the tube 1 and valve 4 into the neck C of the fuel tank.

The modification, as shown in Fig. 4, incorporates a frusto-conical tank neck sealing member 11, surrounding the tube 7, which is similar to the hereinbefore described tube 1. The tube 7 is provided with a valve 9, similar to the valve 4 hereinbefore described, and the bulb 8, which is a resilient hollow spheroid bulb, is connected in communicative relation with the upper end of the tube 7, and is provided with an inlet check valve 10.

In the operation of this modified form, the bulb 8 is consecutively compressed, during which time the conical portion of the tank neck sealing member 11, is placed in the opening B of the neck C, as shown in Fig. 1 of the drawings, in place of the spheroid shape of the tank neck sealing member 3. The check valve 10 of the modified structure shown in Fig. 4 permits the bulb to fill up with air, and prevents the air from being forced out of the bulb 8 when squeezed, which causes the air to pass downwardly through the valve 9. The valve 9, in return, prevents the air from passing backwardly into the bulb 8.

Though I have shown and described a particular construction, combination and arrangement of parts and portions, and a certain modification, I do not wish to be limited to this particular construction, combination and arrangement, nor to the modification, but desire to include in the scope of my invention the construction, combination and arrangement substantially as set forth in the appended claim.

Having thus described my invention, what I claim as new and desire to secure by Letters Patent is:

An emergency pressuring device for an automobile vehicle fuel tank, comprising a flexible elongated air conducting tube, a spherical member adjacent one end of the tube and through which said tube extends in sealed relationship therewith, said member being soft, resilient and considerably larger in diameter than said tube to adapt the member for sealing engagement with the end of a fuel tank neck, a sensitive check valve operatively mounted on said one end adjacent the spherical member, the other end of the tube remote from said member comprising a combination mouthpiece and socket for an air pump delivery tube, said combination mouthpiece and socket facilitating delivery of pressurized air into the tube by lung power and air pump selectively, whereby air may be forced into a tank without danger of inhalation or escape of gasoline or gasoline fumes.

References Cited in the file of this patent

UNITED STATES PATENTS

| Number | Name | Date |
|---|---|---|
| 282,090 | Kennish | July 31, 1883 |
| 619,845 | Shattuck | Feb. 21, 1899 |
| 718,163 | Sherrard | Jan. 13, 1903 |
| 849,772 | Cordeaux | Apr. 9, 1907 |
| 1,051,554 | Champion | Jan. 28, 1913 |
| 1,341,393 | Stokes | May 25, 1920 |
| 1,370,706 | Price | Mar. 8, 1921 |
| 1,490,802 | Davis | Apr. 15, 1924 |
| 1,661,972 | Shadid | Mar. 6, 1928 |
| 1,942,845 | Stephens | Jan. 9, 1934 |
| 2,168,841 | Kantor | Aug. 8, 1939 |
| 2,223,256 | Kross | Nov. 26, 1940 |